US012502882B2

(12) United States Patent
Bauer et al.

(10) Patent No.: US 12,502,882 B2
(45) Date of Patent: Dec. 23, 2025

(54) SHEET PROCESSING MACHINE WITH COOLING ROLLER AND INSPECTION DEVICE AS WELL AS A SHEET PRINTING MACHINE WITH SIMULTANEOUS DOUBLE PRINTING UNIT, CURING DEVICE AND COOLING DEVICE

(71) Applicant: KOENIG & BAUER AG, Würzburg (DE)

(72) Inventors: Stefan Bauer, Thüngersheim (DE); Tobias Diehm, Wertheim (DE); Patrick Kreß, Bad Mergentheim-Edelfingen (DE); Jean-Baptiste Lanternier, Neuvecelle (FR); Johannes Schweers, Verl (DE); Sylwia Szczukiewicz, Saint-Aubin-Sauges (CH); Thomas Türke, Lonay (CH)

(73) Assignee: KOENIG & BAUER AG, Würzburg (DE)

( * ) Notice: Subject to any disclaimer, the term of this patent is extended or adjusted under 35 U.S.C. 154(b) by 0 days.

(21) Appl. No.: 19/101,292

(22) PCT Filed: Aug. 7, 2024

(86) PCT No.: PCT/EP2024/072330
§ 371 (c)(1),
(2) Date: Feb. 5, 2025

(87) PCT Pub. No.: WO2025/045539
PCT Pub. Date: Mar. 6, 2025

(65) Prior Publication Data

US 2025/0256501 A1 Aug. 14, 2025

(30) Foreign Application Priority Data

Aug. 25, 2023 (DE) ......................... 102023122880.3
Aug. 25, 2023 (DE) ......................... 102023122881.1

(51) Int. Cl.
*B41F 13/22* (2006.01)
*B41F 13/10* (2006.01)
(Continued)

(52) U.S. Cl.
CPC .............. *B41F 13/22* (2013.01); *B41F 13/10* (2013.01); *B41F 21/04* (2013.01); *B41F 23/045* (2013.01)

(58) Field of Classification Search
CPC .......... B41F 13/22; B41F 13/10; B41F 21/04; B41F 23/045; B41F 23/0479; B41F 23/0483
See application file for complete search history.

(56) References Cited

U.S. PATENT DOCUMENTS

2016/0185102 A1* 6/2016 Schaede ................ B41F 17/008 101/76
2021/0237426 A1* 8/2021 Bauer ..................... B41F 33/02
(Continued)

FOREIGN PATENT DOCUMENTS

DE 477308 C 6/1929
DE 102005062203 A1 6/2007
(Continued)

OTHER PUBLICATIONS

Japanese Office Action received in corresponding Japanese Application No. 2025-514370 dated Sep. 11, 2025.

*Primary Examiner* — Stephen D Meier
*Assistant Examiner* — Leo T Hinze
(74) *Attorney, Agent, or Firm* — MATTINGLY & MALUR, PC

(57) ABSTRACT

Examples include a sheet processing machine to which a transport path is assigned for transporting sheets. The sheet processing machine includes an application device with an application point for applying material to the sheets. A
(Continued)

cooling device including a cooling cylinder is arranged along the transport path, downstream from the application point. An inspection transport body is arranged along the transport path, downstream from the cooling cylinder, and has a sensor device of an inspection unit aligned therewith. Examples further include a sheet-fed printing machine with a simultaneous double printing unit and an application point. A curing device with an LED UV radiation source is arranged downstream from the application point and includes two curing units for drying two opposite sides of sheets. A cooling device of the curing device includes a cooling element with a line system, and the cooling section is arranged downstream from the curing section.

15 Claims, 9 Drawing Sheets

(51) Int. Cl.
*B41F 21/04* (2006.01)
*B41F 23/04* (2006.01)

(56) References Cited

U.S. PATENT DOCUMENTS

| | | | | |
|---|---|---|---|---|
| 2021/0309005 | A1* | 10/2021 | Siemer | B41F 21/005 |
| 2021/0362487 | A1* | 11/2021 | Bauer | B41M 3/14 |

FOREIGN PATENT DOCUMENTS

| | | | |
|---|---|---|---|
| DE | 102013200113 | A1 | 7/2014 |
| DE | 102013213998 | A1 | 1/2015 |
| DE | 102018127936 | A1 | 5/2020 |
| DE | 102019108765 | A1 | 10/2020 |
| DE | 102018212429 | B4 | 12/2021 |
| EP | 0557245 | A1 | 8/1993 |
| EP | 1142712 | A1 | 10/2001 |
| EP | 3015266 | A | 5/2016 |
| EP | 3130468 | A2 | 2/2017 |
| EP | 3530460 | A1 | 8/2019 |
| JP | 4-104442 | U | 9/1992 |
| WO | 2004039589 | A1 | 5/2004 |
| WO | 2011145028 | A1 | 11/2011 |
| WO | 2020200703 | A1 | 10/2020 |

* cited by examiner

SHEET PROCESSING MACHINE WITH COOLING ROLLER AND INSPECTION DEVICE AS WELL AS A SHEET PRINTING MACHINE WITH SIMULTANEOUS DOUBLE PRINTING UNIT, CURING DEVICE AND COOLING DEVICE

CROSS-REFERENCES TO RELATED APPLICATIONS

This application is the US national phase, under 35 USC § 371, of PCT/EP2024/072330, filed on Aug. 7, 2024, and claiming priority to DE 10 2023 122 881.1 filed on Aug. 25, 2023, and DE 10 2023 122 880.3 filed on Aug. 25, 2023, and all of which are incorporated by reference herein in their entireties.

TECHNICAL FIELD

Some examples herein relate to a sheet processing machine with cooling roller and inspection device as well as a sheet-fed printing machine with simultaneous double printing unit, curing device and cooling device.

BACKGROUND

A device for drying and inspecting sheets in a securities printing machine is known from EP 1 142 712 A1.

A printing machine is known from EP 3 530 460 A1, comprising a curing chamber that is partly delimited by a cooling cylinder and partly by UV lamps designed as LED lamps.

A rotating body of a printing machine is known from WO 2004/039589 A1, which comprises a line system designed for conducting through temperature control medium.

A Discharge Drum of a Gravure Printing Machine is Known from DE 477 308 a, which Comprises Grippers and Cavities for Cooling Water.

A cylinder for a machine that processes web-format material is known from EP 0 557 245 A1, which comprises liquid lines.

A respective sheet processing machine is known from EP 3 130 468 A2 and WO 2011/145028 A1, comprising an application device with an application point, wherein initially at least one inspection transport body with a respective inspection device aligned therewith, and thereafter a cooling cylinder are arranged along a transport path provided for sheets, downstream from the application point.

A sheet processing machine is known from DE 10 2018 212 429 B4, comprising an application device with an application point, wherein comprises a cooling cylinder, along a transport path provided for sheets, downstream from the application point, with which an inspection device can be aligned.

A sheet-fed printing machine is known from DE 10 2005 062 203 A1, comprising a cylinder that comprises cooling elements for temporarily holding sheets by means of a layer of frozen adhesive. In this way, the sheets are intended to be held securely on this cylinder for an inspection.

A respective screen printing machine is known from DE 10 2019 108 765 A1 and WO 2020/200703 A1, by means of which sheets can be printed on one side and which, along a transport path for sheets, downstream from an application device comprises a curing device with radiation sources designed as UV-LEDs, and thereafter a cooling cylinder.

A web-fed printing machine with ink jet printing devices is known from DE 10 2013 213 998 A1, comprising infrared radiation dryers and cooling rollers.

A web-fed printing machine is known from DE 10 2013 200 113 A1, which comprises a drying device and the web transport path of which can be changed in such a way that selectively a first or a second side of a web can be printed and dried.

A screen printing machine is known from DE 10 2018 127 936 A1, which prints sheets on one side and comprises a curing device with radiation sources designed as UV-LEDs, and a cooling cylinder.

A sheet processing machine with an application device and a magnetic alignment device is known from EP 3 015 266 A1, wherein a camera is provided for monitoring a transport of sheets in the region of the alignment device.

SUMMARY

It is an object of some examples herein to provide a sheet processing machine with a cooling roller and an inspection device as well as a sheet-fed printing machine with a simultaneous double printing unit and a curing device.

The object discussed above is achieved in some examples by a sheet processing machine including at least one transport path provided for a transport of sheets assigned to the sheet processing machine. The sheet processing machine includes at least one application device with at least one application point arranged along the transport path provided for the transport of sheets for applying material to the sheets. At least one cooling device is arranged along the transport path, downstream from the at least one application point, and which includes at least one cooling element designed as a cooling cylinder. At least one first inspection transport body is arranged along the transport path, downstream from the at least one cooling element, and with which at least one sensor device of a first inspection unit is aligned. The first inspection unit includes at least one sensor device for detecting electromagnetic radiation in the visible range of the spectrum, and the first inspection unit includes at least one sensor device for detecting electromagnetic radiation in a first portion of the infrared region of the spectrum.

The object discussed above is further achieved in some examples by a sheet-fed printing machine including a transport path provided for a transport of sheets assigned to the sheet-fed printing machine. The sheet-fed printing machine including at least one application device designed as a simultaneous double printing unit with at least one application point arranged along the transport path provided for the transport of sheets for applying material to the sheets. A curing device, which includes at least one LED UV radiation source, is arranged along the transport path, downstream from the at least one application point. The curing device includes a first curing unit for drying a first side of the sheets and a second curing unit for drying a second side of the sheets located opposite the first side. The transport path extends between the first curing unit and the second curing unit, and at least one cooling device is assigned to the curing device. The at least one cooling device includes at least one cooling element, which includes a line system through which cooling liquid can flow for the transport thereof. At least one curing section of the transport path is defined by at least one operating zone of the curing unit, and a cooling section of the transport path is defined by at least one operating zone of the at least one cooling element. Any cooling section is arranged downstream from any curing section, and the sheet-fed printing machine further includes at least one inspection device, which is arranged so as to be aligned with a region of the transport path that is arranged downstream from the at least one cooling element. The at least one inspection device includes a first inspection unit and the first inspection unit includes at least one sensor device for detecting electromagnetic radiation in the visible range of the spectrum. The first inspection unit further includes at least one sensor device for detecting electromagnetic radiation in a first portion of the infrared region of the spectrum.

A transport path provided for a transport of sheets is assigned to a sheet processing machine. The sheet processing machine comprises at least one application device with at least one application point for applying material to sheets, which is arranged along the transport path provided for the transport of sheets. The sheet processing machine is preferably designed as a sheet-fed printing machine. Preferably, a curing device, which more preferably comprises at least one UV radiation source, which more preferably is designed as an LED UV radiation source, is arranged along the transport path provided for the transport of sheets, downstream from the at least one application point. At least one cooling device is preferably assigned to the curing device, comprising at least one cooling element, which more preferably comprises a line system through which cooling liquid can flow for the transport thereof. The at least one cooling element is preferably designed as a rotatable cooling cylinder. Preferably, the at least one cooling device, comprising the at least one cooling element, which more preferably is designed as a cooling cylinder, is arranged along the transport path provided for the transport of sheets, downstream from the at least one application point. The arrangement of a cooling device ensures rapid cooling of the substrate after curing. The substrate is thus protected and can be inspected and/or further processed more quickly. For example, a deformation of the substrate during curing is decreased or avoided.

Preferably, at least one curing section of the transport path provided for the transport of sheets is defined by at least one operating zone of the curing device. Preferably, a cooling section of the transport path provided for the transport of sheets is defined by at least one operating zone of the at least one cooling element. Preferably, any cooling section is arranged downstream from any curing section. Due to the spatial separation of the curing section and the cooling section, a first phase of the cooling process can take place passively, that is, in particular by giving off heat to ambient air. In this first phase, the temperature difference between the substrate and the surrounding area is the greatest so that passive cooling is most effective. After the first phase of the cooling process, the cooling by the at least one cooling element can then be utilized particularly efficiently. Moreover, it is avoided that the at least one cooling element comes in contact with applied material that has not cured yet. In this way, soiling of the at least one cooling element is avoided.

The cooling cylinder preferably comprises at least one gripper system for gripping sheets. This enables a particularly secure transport of sheet-format substrate.

The at least one application device preferably comprises at least one forme cylinder, which is in particular designed to carry at least one printing forme, and an effective circumference of the at least one cooling cylinder corresponds to an integer multiple of an effective circumference of this at least one forme cylinder. Due to the circumference being at least twice as large, a particularly large distance of the transport path provided for the transport of sheets is defined by the cooling cylinder, and thus the operating zone thereof is increased. This ensures particularly effective cooling and enables a high transport speed, and thus a high printing speed.

Preferably, a curing device is arranged along the transport path provided for the transport of sheets, downstream from the at least one application point and upstream from the at least one cooling cylinder. The curing device preferably comprises at least one UV radiation source and/or at least one LED UV radiation source. Such curing devices can be used in an energy-saving manner.

The curing device preferably comprises at least one first curing unit, which comprises a plurality of LED UV radiation sources arranged at various points, based on a transverse direction, so as to be aligned with the transport path provided for the transport of substrate. The curing device preferably comprises at least one first curing unit, and multiple LED UV radiation sources of the at least one first curing unit are arranged consecutively in a transport direction and/or along the transport path provided for the transport of sheets. This enables an operation that is adapted to the particular print job and thus saves energy and conserves material.

Preferably, the curing device comprises at least one second curing unit, and the transport path provided for the transport of sheets extends between the first curing unit and the second curing unit. In this way, the curing process can be optimized, in particular during two-sided printing.

The sheet processing machine preferably comprises a curing and inspection module, wherein more preferably the curing and inspection module comprises the curing device and the at least one cooling element designed as a cooling cylinder and the at least one inspection device and/or the curing and inspection module comprises a dedicated machine frame. This, in particular, enables simple retrofitting of existing systems. Moreover, when configured appropriately, particularly easy accessibility of the individual components is ensured.

The sheet processing machine preferably comprises at least one inspection device, which is arranged so as to be aligned with a region of the transport path provided for the transport of sheets, which is arranged downstream from the at least one cooling element. Preferably, at least one first inspection transport body, which more preferably is designed as an inspection transport cylinder and with which at least one sensor device of a first inspection unit is aligned, is arranged along the transport path provided for the transport of sheets, downstream from the at least one cooling element. Cooling the substrate prior to the inspection thereof ensures that the printed material is inspected in a state that comes closest to the desired final state, and undesirable temperature-induced uncertainties of the inspection are thus avoided. For example, no negative influencing of the spectrum of the radiation originating from the substrate due to superimposition with corresponding heat radiation takes place. This is, in particular, advantageous when inspecting in the infrared range. In particular when curing and cooling take place first, and an inspection takes place thereafter, it is also ensured, in addition to the advantages with respect to the inspection, that the inspection transport bodies are not soiled by applied material, such as printing ink or varnish. As a result, the print quality can be increased since undesirable back transfer is avoided. Moreover, it is avoided that the processing machine has to be stopped for cleaning and/or maintenance work an undesirably large number of times.

Preferably, the at least one inspection device comprises a first inspection unit, in particular for inspecting a first side of sheets, and more preferably an, in particular additional, second inspection unit, in particular for inspecting a second side of sheets. The transport path provided for the transport of sheets preferably extends between the first inspection unit and the second inspection unit. Preferably, a second inspection transport body, which is in particular designed as a second inspection transport cylinder and with which at least one sensor device of the second inspection unit is aligned, is assigned to the second inspection unit. This allows an easy inspection of both sides of a substrate.

The first inspection unit preferably comprises at least one sensor device for detecting electromagnetic radiation in the visible range of the spectrum. The first inspection unit preferably comprises at least one sensor device for detecting electromagnetic radiation in a first portion of the infrared region of the spectrum. In this way, for example, security features of securities can be inspected to ensure correct production.

The first inspection transport body or inspection transport cylinder preferably comprises at least one gripper system for gripping sheets and/or the first inspection transport body or inspection transport cylinder is designed as a suction transport cylinder. Each of these units increases a precision of the position and of the transport of the, in particular sheet-format, substrate on the corresponding inspection transport body or inspection transport cylinder.

Preferably, the sheet processing machine comprises an upstream sheet transport means, which is in particular designed as a first chain conveyor system or preferably chain gripper system, which more preferably comprises at least one rear chain deflection shaft, and an in particular first transfer point for transferring sheets from the upstream sheet transport means to the cooling element, which is preferably designed as a cooling cylinder, is defined, in particular in the region of the rear chain deflection shaft of the first chain conveyor system. It is then possible, for example, for the curing section to be arranged in the region of the chain conveyor system, in which an almost contactless transport, and thus improved passive cooling, without heating of components, is enabled. Accordingly, no transport cylinder becomes excessively heated and/or no transport cylinder, for example, requires excessive cooling.

The sheet processing machine preferably has an in particular second transfer point for transferring sheets from the cooling element, which is preferably designed as a cooling cylinder, to the first inspection transport body or inspection transport cylinder. By arranging these components directly one after the other along the transport path, installation space and/or transfer points can be saved.

The sheet processing machine is preferably designed as a sheet-fed securities printing machine. The sheet processing machine preferably comprises a multiple pile delivery unit. The sheet processing machine preferably comprises at least one simultaneous printing unit and/or at least one simultaneous double printing unit. This then, for example, represents the at least one application device. Prints having a particularly high color register quality can be implemented by means of a simultaneous printing unit. In addition, prints having a particularly high perfecting register quality can be implemented by means of a simultaneous double printing unit. As a result of the conservative treatment of the material and corresponding inspection, in particular in the dried and already cooled state, additionally an overall particularly high product quality can be achieved.

The cooling cylinder preferably comprises at least one cylinder barrel and two cylinder journals arranged at the ends thereof, wherein a cylinder axis is assigned to the cylinder barrel. The cooling cylinder preferably comprises a line system designed for conducting through temperature control medium. Preferably, the cylinder barrel comprises at least one base body, which is more preferably made at least 50% of aluminum. This enables a particularly high thermal conductivity and, at the same time, a low moment of inertia and consequently high possible accelerations. An outer surface of the cylinder barrel preferably comprises at least one transport region, which is designed as a bearing surface for sheet-format substrate, wherein the outer surface of the cylinder barrel preferably comprises at least one cylinder channel in which at least one holding means, comprising a gripper system, for holding sheet-format substrate is arranged. The base body preferably comprises a multitude of flow lines configured as boreholes, which extend parallel to the cylinder axis and are designed as components of the line system. This allows a particularly simple design of the cooling cylinder. The base body preferably comprises a layer produced by way of anodizing on the outer surface thereof.

The base body is preferably designed as a substantially tubular base body. This also contributes to a simple design. The base body preferably has an inner cavity, which extends parallel to the cylinder axis across the entire base body and the dimension of which oriented orthogonally with respect to the cylinder axis is at least 50% of a maximum outside diameter of the base body. This enables a lightweight but stable design. The flow lines configured as boreholes preferably extend parallel to the cylinder axis across the entire base body. The cylinder barrel preferably comprises at least two end pieces, which each include line sections and are connected, in terms of flow, to the flow lines of the base body.

For controlling the gripper system of the at least one holding means, the cooling cylinder preferably comprises at least one scanning means that is designed to cooperate with a cam disk.

In addition to the cooling cylinder, the sheet processing machine preferably comprises at least one drive motor, wherein more preferably the cooling cylinder comprises a gear wheel at a cylinder journal and the at least one drive motor is connected to the at least one gear wheel in a manner that transmits or is capable of transmitting torque.

BRIEF DESCRIPTION OF THE DRAWINGS

Exemplary embodiments of the invention are illustrated in the drawings and will be described in greater detail below. The figures show.

DETAILED DESCRIPTION

Figure 1A:
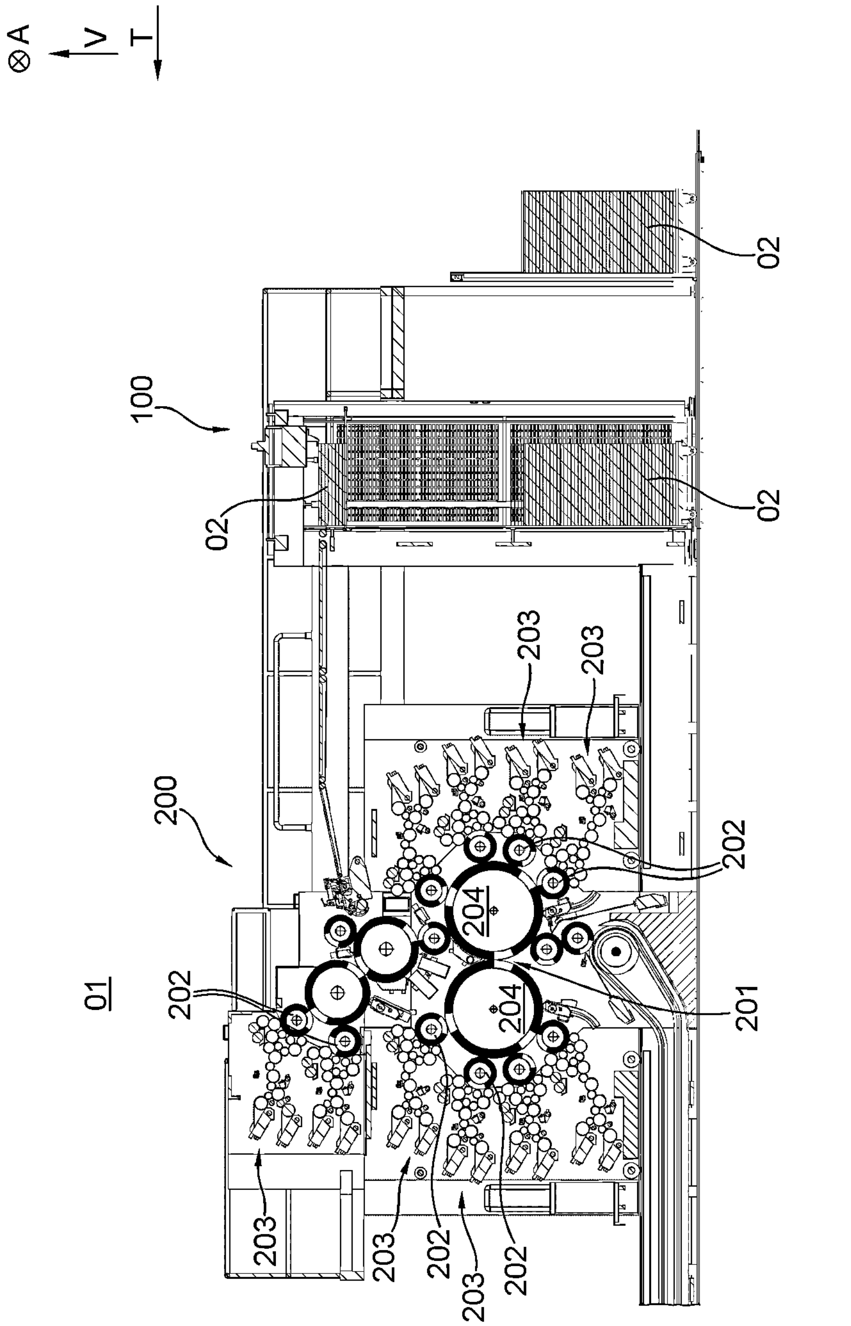
FIG. 1*a* a schematic illustration of a part of an exemplary sheet processing machine, designed as a printing machine, which comprises a substrate feed device and a printing unit.

A substrate processing machine 01 is preferably designed as a sheet processing machine 01. A sheet processing machine 01 is designed, for example, as a sheet-fed printing machine 01, in particular as a sheet-fed rotary printing machine 01. The sheet processing machine 01 is preferably designed as a securities sheet processing machine 01, in particular as a sheet-fed securities printing machine 01. An exemplary sheet processing machine 01 is described hereafter.

The sheet processing machine 01 comprises, for example, a substrate feed device 100. The sheet processing machine 01 comprises, for example, at least one processing device 200 or sheet processing device 200, which is designed, for example, as an application device 200. The sheet processing machine 01 comprises, for example, at least one curing device 300. The sheet processing machine 01 comprises, for example, at least one cooling device 301. For example, the sheet processing machine 01 comprises at least one inspection device 400. The sheet processing machine 01 comprises, for example, at least one substrate output device 500. A transport path provided for a transport of sheets 02 is preferably assigned to the sheet processing machine 01.

The sheet processing machine 01 preferably comprises the at least one substrate feed device 100 or printing substrate feed device 100 or sheet feed device 100 designed as a sheet feeder 100, in particular in addition to the at least one sheet processing device 200 and/or along a transport path provided for a transport of substrate 02, in particular sheets 02, upstream from the at least one, and more preferably upstream from each, sheet processing device 200. The at least one substrate feed device 100, comprises, for example, a conveyor line designed, for example, as a feed table. For example, at least one receiving unit designed as a pile board is provided. It is then possible for printing substrate bundles, designed as sheet piles, to be arranged thereon for separation. The receiving unit is preferably connected to at least one transport means, which ensures that the respective uppermost sheet of the sheet pile is arranged in a defined position, including when the sheet pile is being processed. The substrate feed device 100 preferably comprises sheet separation elements and sheet transport elements. The sheet separation elements are designed as separating suckers, for example. The sheet transport elements are designed as transport suckers, for example. Preferably, at least one front stop is provided. For example, the substrate feed device 100 comprises at least one non-stop device for an uninterrupted supply of sheets 02, including when a succeeding pile is provided. The feed table arranged downstream from the sheet pile is designed as a suction feed table. For example, at least one infeed device referred to as a sheet infeed is provided, which preferably comprises a feed table and comprises at least one movable front stop.

A transverse direction A is preferably a horizontal direction A that is oriented orthogonally with respect to a transport direction T. In particular in the case of a curved transport path, the transport direction T is preferably in each case the direction T that runs tangential to a segment and/or point of the provided transport path closest to a respective reference point and that is provided for the transport of the substrate 02 and/or sheet 02 at this segment and/or point. This particular reference point is preferably situated at the point and/or at the component that is being related to the transport direction T. The transport direction T thus preferably in each case extends along the transport path provided for substrate 02 and/or sheets 02.

The processing machine 01 preferably comprises at least one processing device 200 for processing substrate 02. The substrate 02 is preferably designed as sheet-format substrate 02. The at least one processing device 200 comprises at least one processing point 201. The at least one processing device 200 is designed, for example, as an application device 200 and preferably comprises at least one processing point 201 designed as an application point 201 for applying material to, in particular sheet-format, substrate 02. The sheet processing machine 01 preferably comprises at least one application device 200 with at least one application point 201 for applying material to sheets 02, which is arranged along the transport path provided for the transport of sheets 02. The at least one processing device 200 is preferably designed as a printing unit 200 and comprises at least one processing point 201 designed as a printing nip 201. For example, the application device 200 is designed as a tool-dependent application device 200 and/or comprises at least one forme cylinder 202, which is designed, for example, as a plate cylinder 202. As an alternative or in addition, the application device 200 is, for example, designed as a non-impact application device 200 and/or comprises at least one activatable print head. The at least one printing unit 200 preferably comprises at least one printing mechanism 203 and/or at least one forme cylinder 202. Each such printing mechanism 203, for example, comprises an inking unit assigned thereto and/or a dampening unit assigned thereto.

A printing unit 200, which comprises at least one forme cylinder 202 and at least one printing mechanism 203, is described hereafter by way of example as an application device 200. The at least one forme cylinder 202 is preferably designed as at least one plate cylinder 202. The printing unit 200 is preferably designed as a multicolor printing unit 200. Preferably, multiple printing mechanisms 203 and accordingly multiple inking units are provided in the at least one printing unit 200 so as to print various printing inks onto the same substrate 02 during the same production run, for example in keeping with the number of these inking units. In one embodiment, printing mechanisms 203 that preferably operate according to differing printing principles are arranged in the same printing unit 200. For example, at least one printing mechanism 203 is designed as a planographic printing mechanism 203, for example an offset printing mechanism 203, and/or at least one other printing mechanism 203 is designed as a letterpress printing mechanism 203, in particular as an indirect letterpress printing mechanism 203. It is possible to employ a waterless offset printing method. As an alternative or in addition, a so-called wet offset printing method can be employed, for which the printing mechanism then comprises at least one dampening unit. These different printing mechanisms 203 then, for example, print the same printing substrate 02 in the same production run, more preferably by means of at least one transfer cylinder 204, and still more preferably by means of at least one shared transfer cylinder 204, which is also referred to as collecting cylinder 204. In one embodiment, at least one printing mechanism 203 is preferably designed as at least one intaglio printing mechanism 203. One example of indirect letterpress printing is letterset printing.

For example, the at least one printing unit 200 is designed as a simultaneous printing unit 200. A simultaneous printing unit 200 comprises a collecting cylinder 204, which is preferably arranged so as to directly cooperate with multiple forme cylinders 202. The inks of the multiple forme cylinders 202 are collected on the collecting cylinder 204 and then transferred together in a printing nip to an appropriate substrate 02. A simultaneous printing unit 200 thus operates according to an indirect printing method, for example an indirect planographic printing method or offset printing method and/or according to an indirect letterpress printing method, in particular a letterset printing method. The simultaneous printing unit 200 is preferably designed as a simultaneous double printing unit 200. In such a unit, two collecting cylinders 204 together form a printing nip 201, in which substrate 02 is simultaneously printed on both sides with multiple colors. Each of the two collecting cylinders 202 cooperates, in particular directly, with multiple forme cylinders 202, for example in each case with exactly two forme cylinders 204 or in each case with exactly four forme cylinders 202.

Preferably, the at least one printing unit 200 comprises at least one transfer cylinder 204, which is preferably designed as a blanket cylinder 204 and by way of the contact region of which with a further cylinder 204, in particular with a further transfer cylinder 204 designed, for example, as a blanket cylinder 204 and/or collecting cylinder 204, a printing nip 201 is preferably defined and which is preferably in contact with multiple forme cylinders 202. The at least one printing unit 200 accordingly preferably comprises at least one pair of transfer cylinders 204, which are preferably designed as blanket cylinders 204 and/or collecting cylinders 204, with a printing nip 201 of the printing unit 200 being defined by the shared contact region thereof. Preferably at least one, and more preferably each of the at least two transfer cylinders 204 is in preferably rolling contact with at least one forme cylinder 202, and more preferably with multiple, for example exactly two or exactly four forme cylinders 202.

Preferably, each inking unit cooperating with a forme cylinder 202 is arranged so as to be movable away from this particular forme cylinder 202. As a result, the corresponding forme cylinder 202 is accessible for maintenance work and/or for a printing plate replacement. More preferably, the inking units of all forme cylinders 202 cooperating with a shared transfer cylinder 204 are arranged so as to be movable away from this forme cylinder 202 together and, for this purpose, are more preferably mounted in a shared frame section.

During a printing operation of the printing machine 01, at least one sheet 02 that is taken from the substrate feed device 100, preferably a sequence of multiple sheets 02, is fed to the printing unit 200. The printing unit 200 preferably operates in recto and verso printing, wherein both sides of the substrate 09 are inked simultaneously in the printing nip 201. More preferably, multi-color print images are transferred in the printing nip 201 to the substrate 02 in a single printing step. These multi-color print images are preferably composed of individual colored print image segments, which were previously transferred from multiple plate cylinders 202 to the corresponding transfer cylinder 204 and collected there. The at least one printing unit 200 is preferably composed of two halves that have substantially the same design. Each of the halves comprises a transfer cylinder 204, which is preferably designed as a blanket cylinder 06. The forme cylinders 202, and in particular printing plates arranged thereon, are preferably each inked with a different printing ink by a respective inking unit. Each of the forme cylinders 202 preferably transfers at least one print image to the corresponding transfer cylinder 204 against which they are placed. In this way, a multi-color print image is preferably created on each transfer cylinder 204, which more preferably is transferred to the substrate 02 in a single step.

Figure 1B:
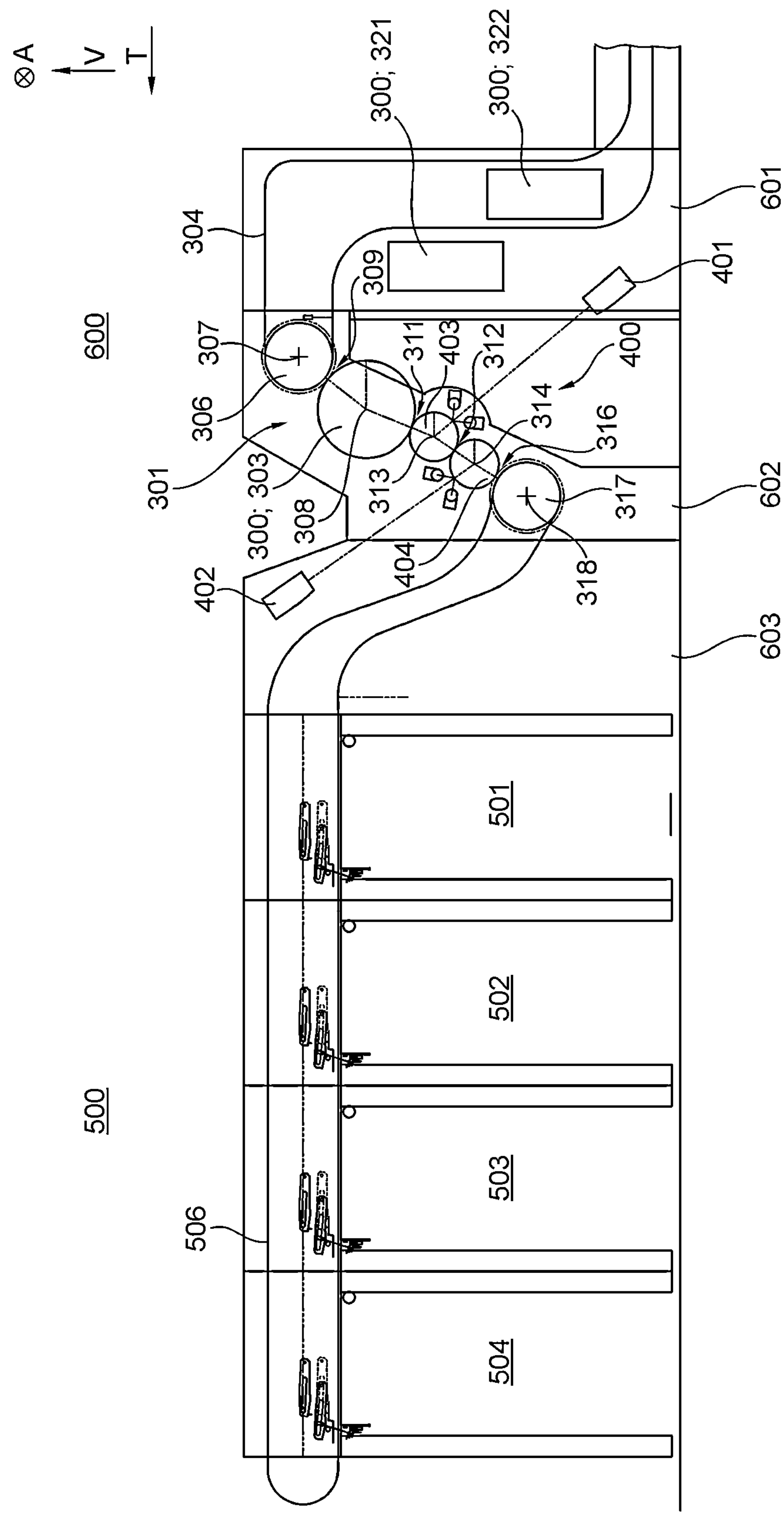
FIG. 1*b* a schematic illustration of a part of the sheet processing machine according to FIG. 1*a* which comprises a curing device, an inspection device, and a substrate output device.
Figure 2:
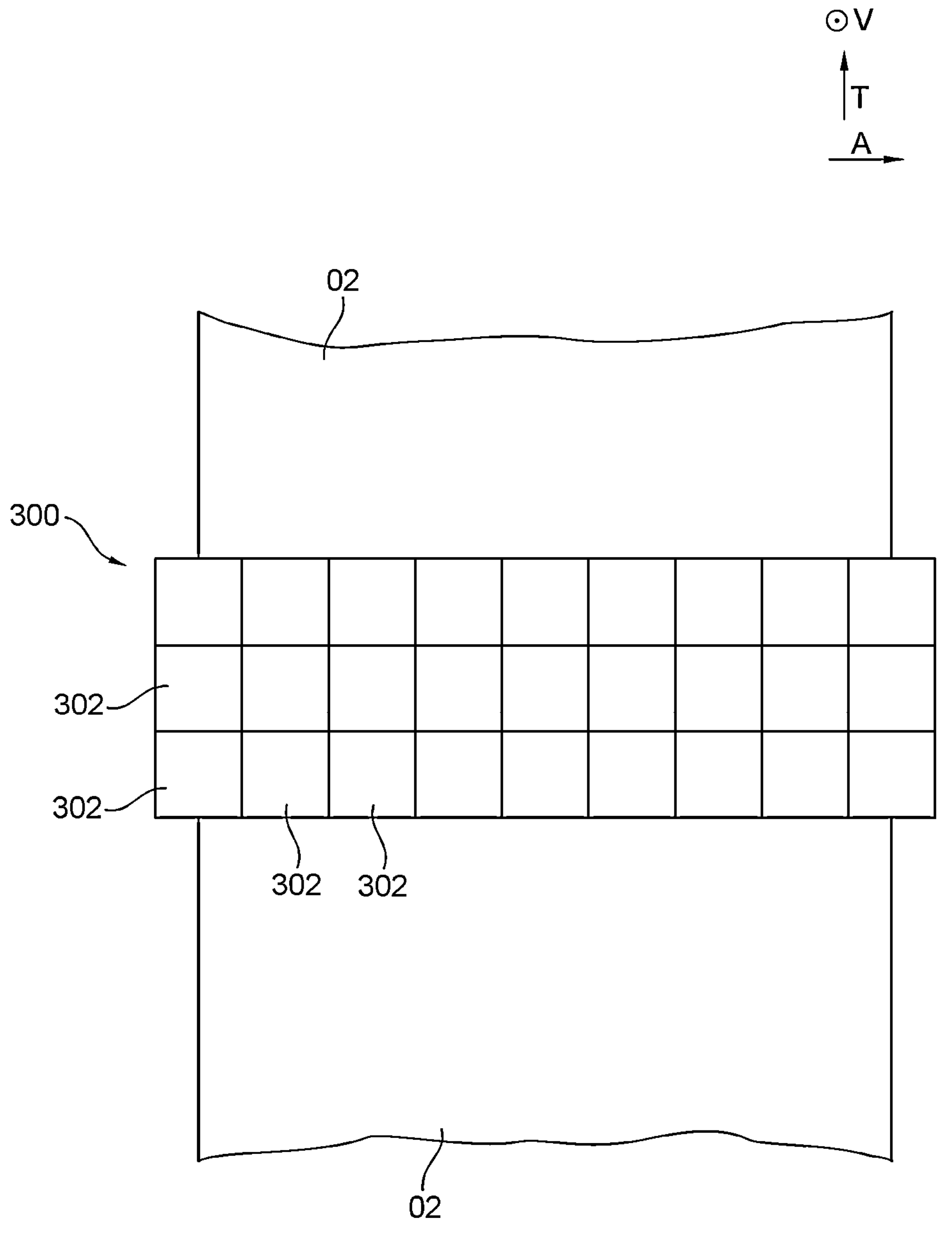
FIG. 2 a schematic illustration of a curing device with multiple radiation sources.
Figure 3:
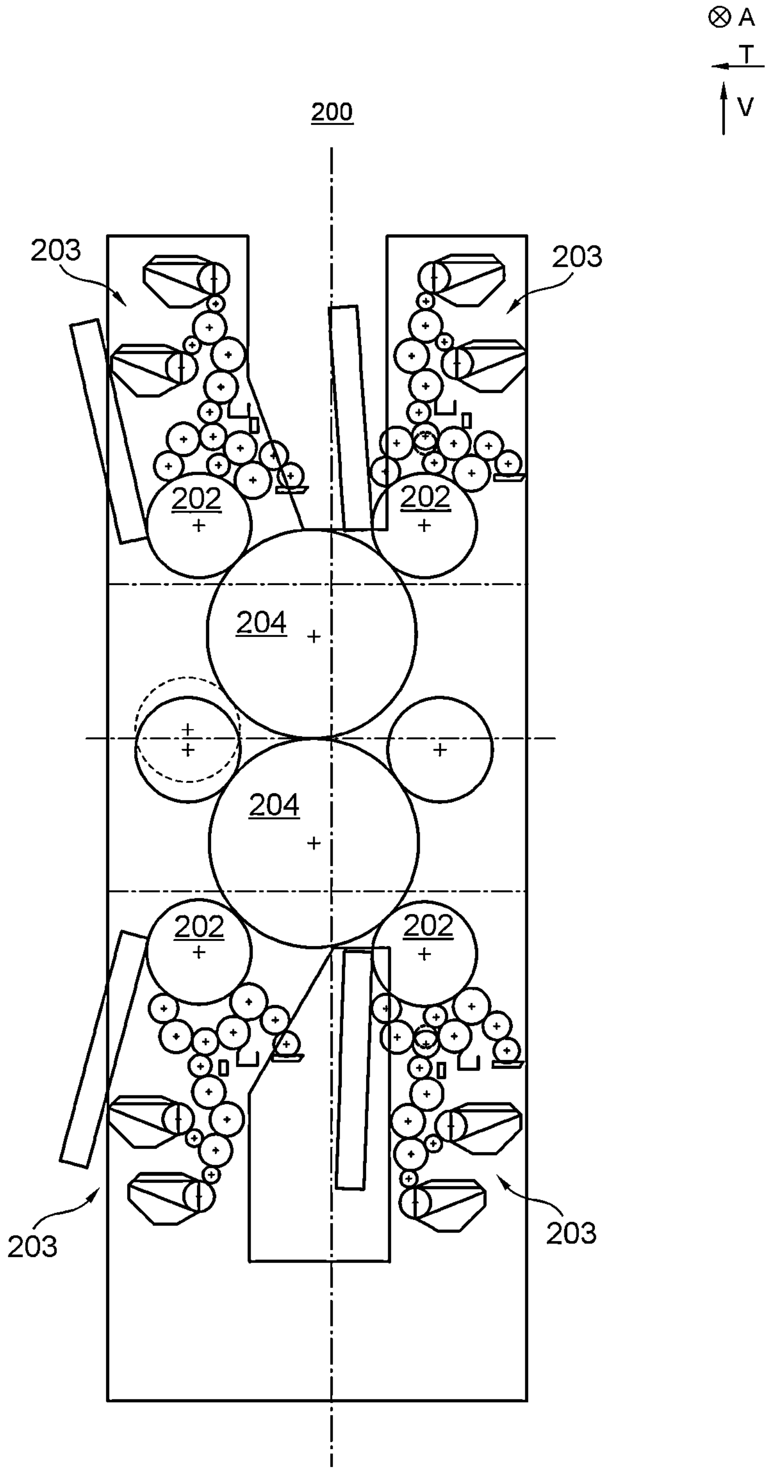
FIG. 3 a schematic illustration of an alternative embodiment of a simultaneous printing unit with two collecting cylinders, which each cooperate with two forme cylinders.
Figure 4:
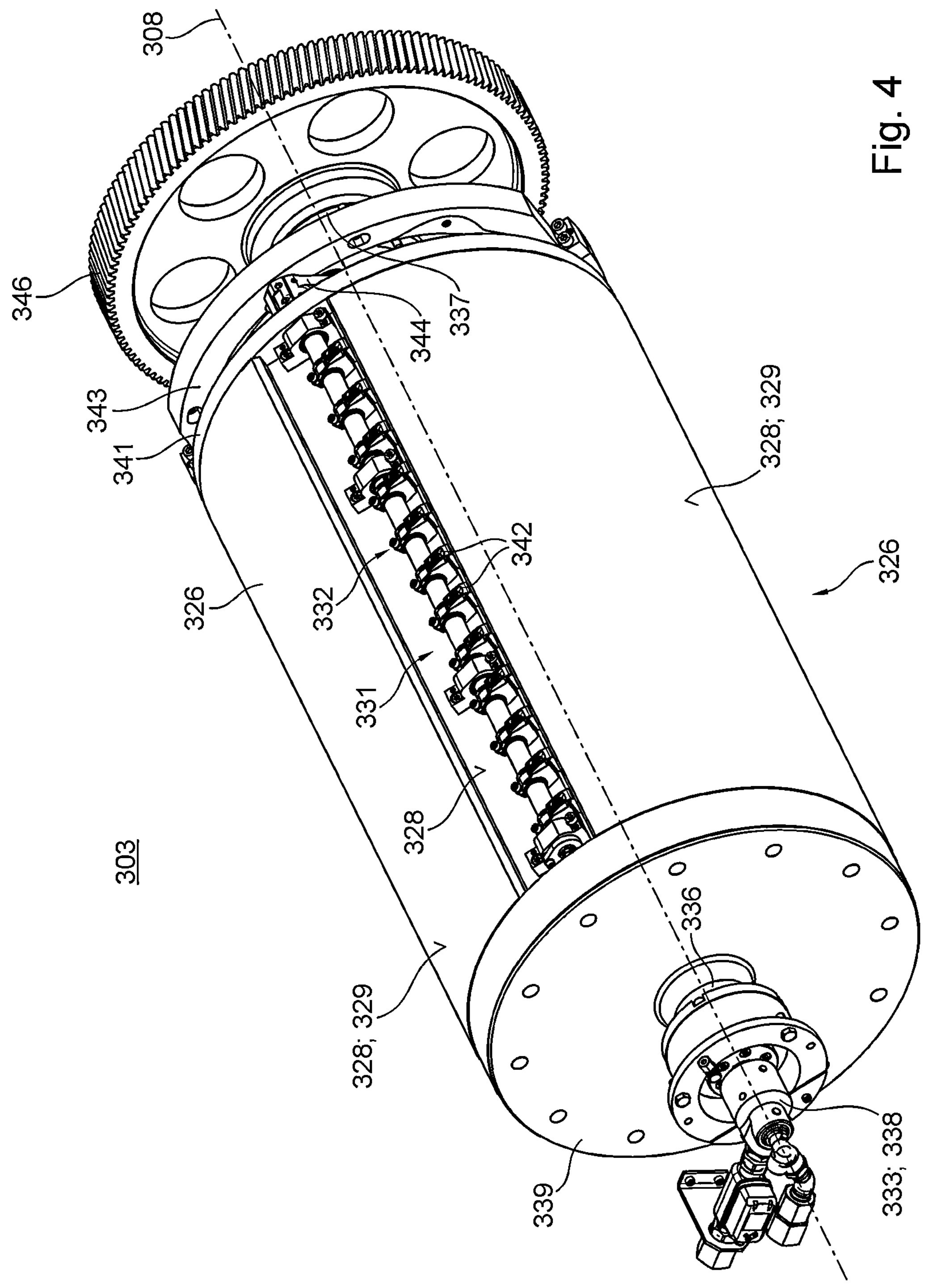
FIG. 4 a schematic illustration of a cooling cylinder with a rotary union and a gear wheel in an oblique view.
Figure 5:
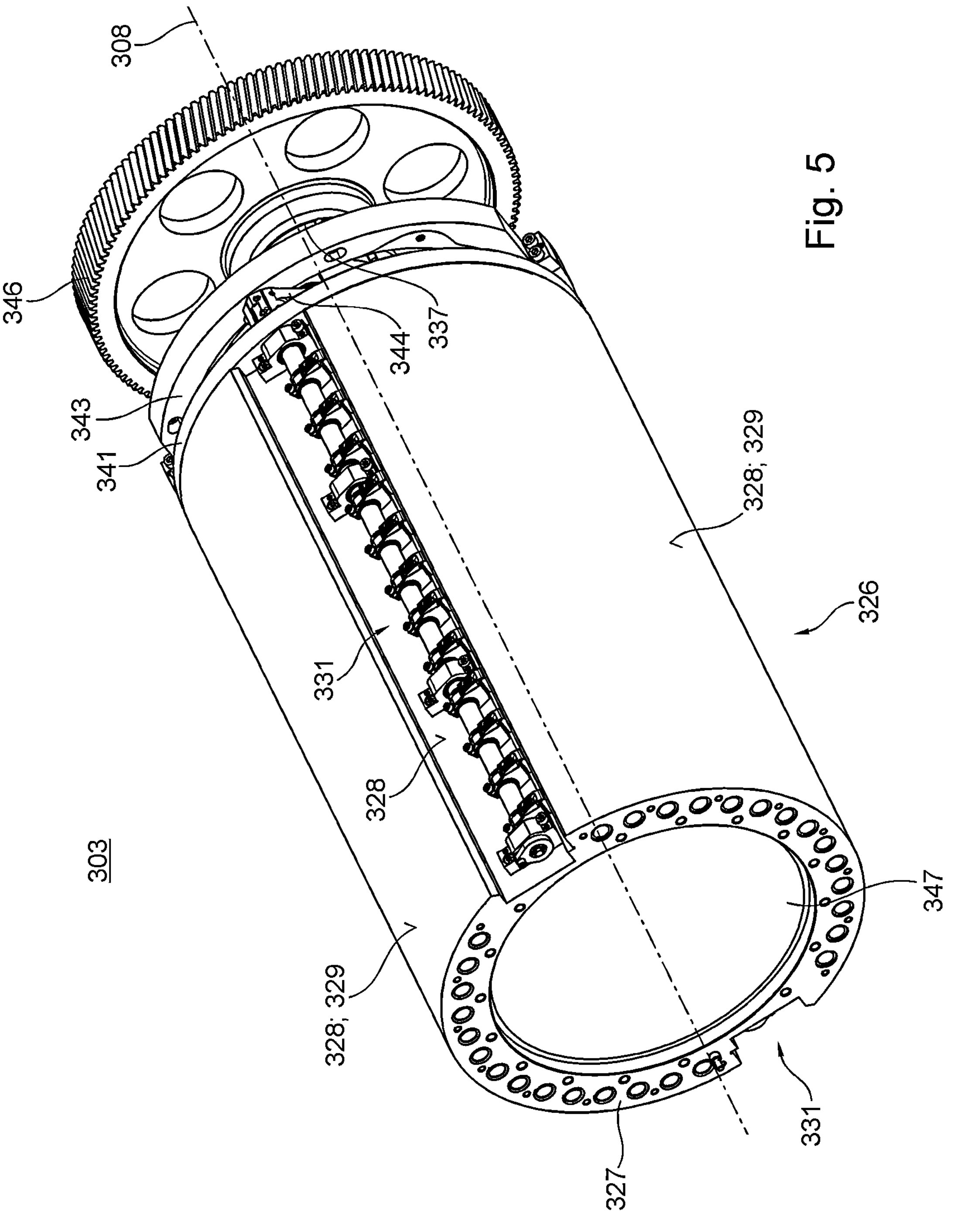
FIG. 5 a schematic illustration according to FIG. 4, wherein an inner region of the cooling cylinder was rendered visible.
Figure 6:
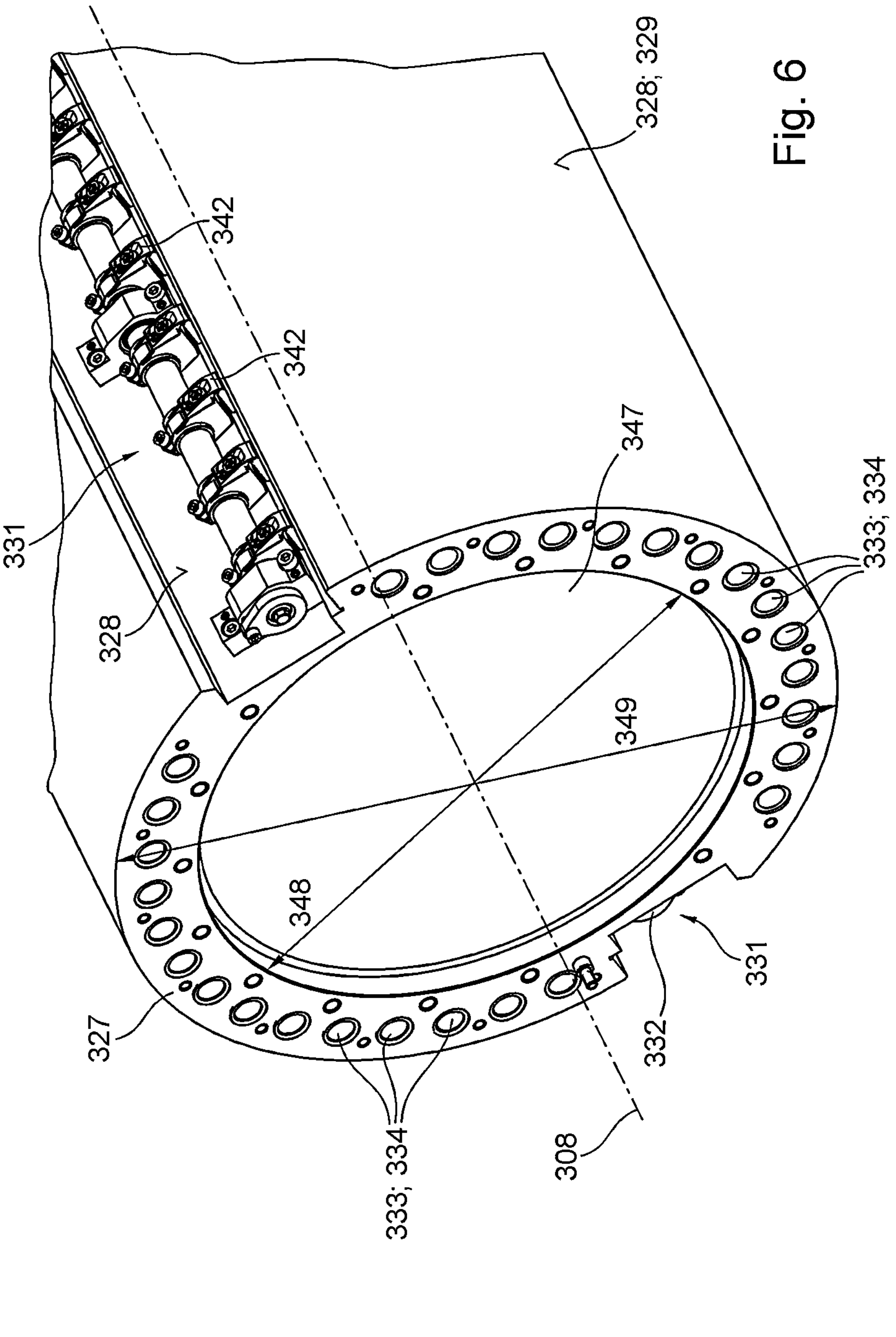
FIG. 6 a schematically enlarged illustration of a part of the illustration according to FIG. 5.
Figure 7:
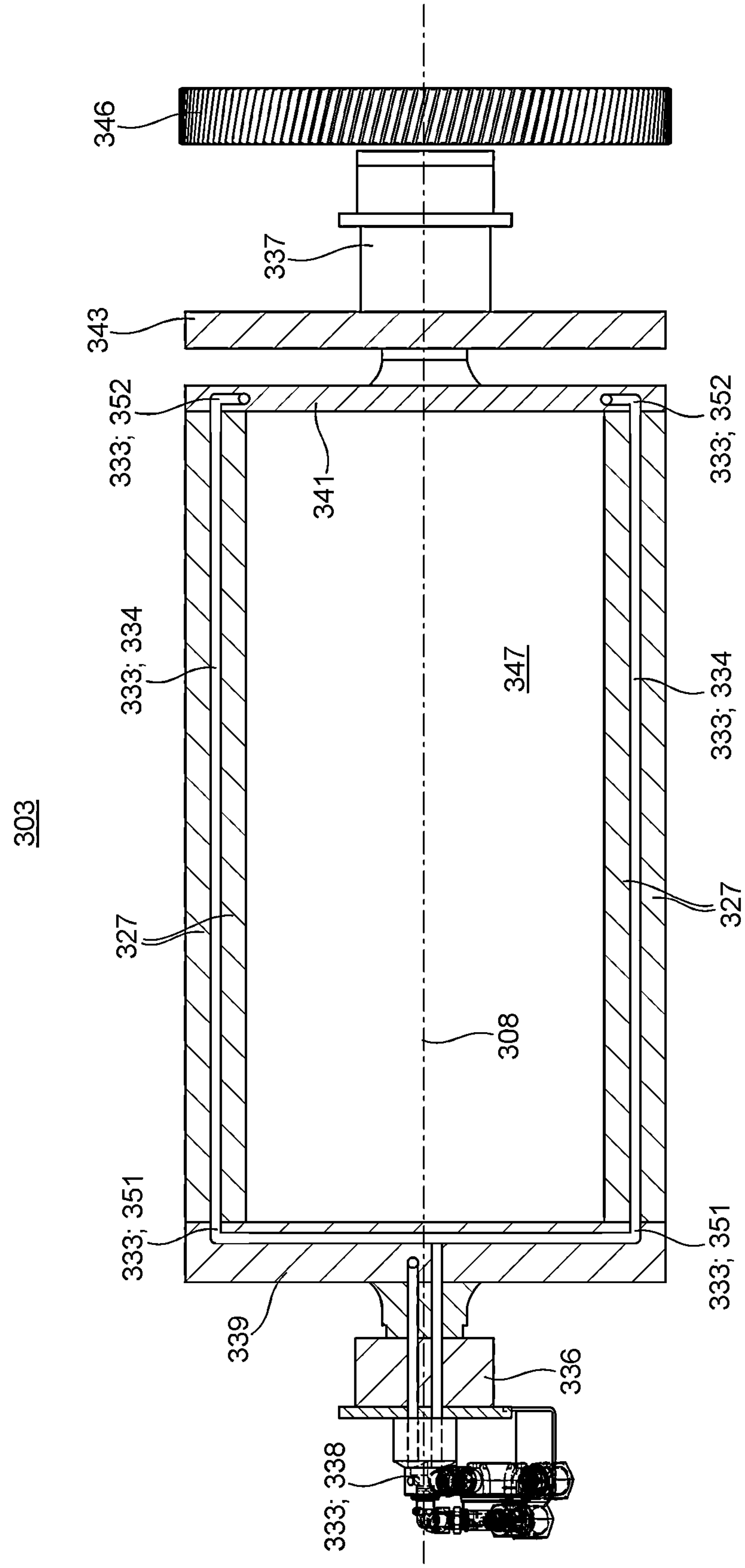
FIG. 7 a schematic illustration, in part as a sectional view, and in part as an elevation, of a cooling cylinder according to FIG. 4.
Figure 8:
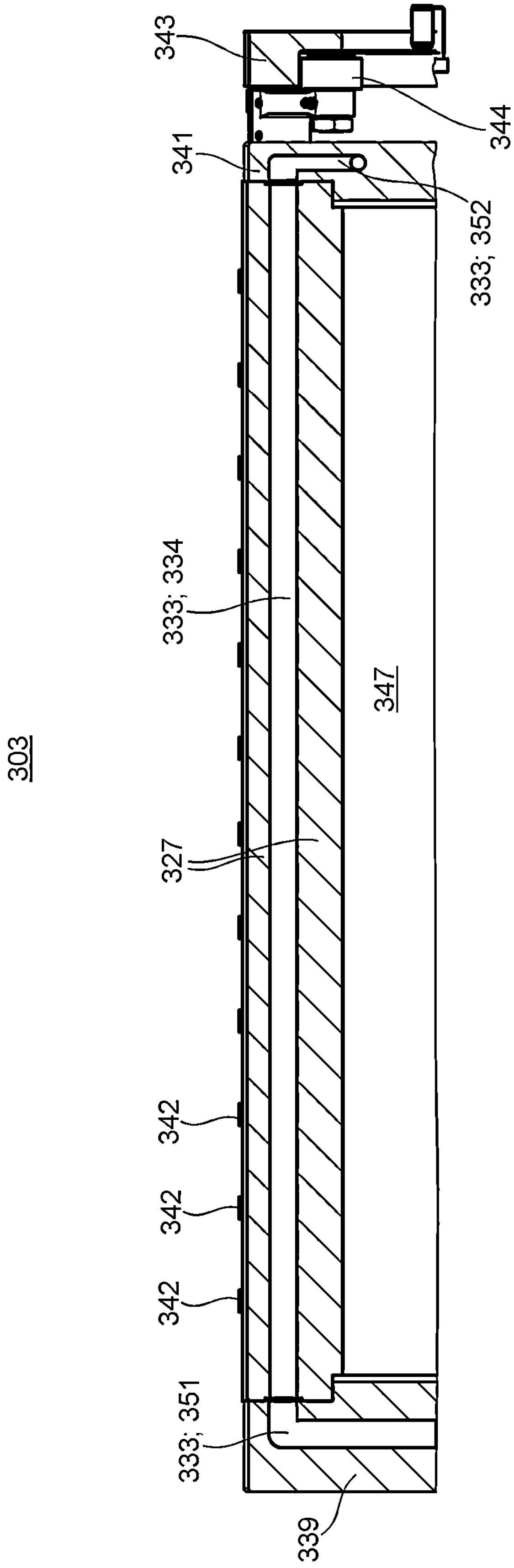
FIG. 8 a schematic illustration of a region of the cooling cylinder and of a cam disk.

The at least one printing unit 200 comprises, for example, one or more additional collecting cylinders 204, which are likewise arranged so as to cooperate with multiple forme cylinders 202. (This is also shown by way of example in FIG. 1).

As an alternative or in addition, the processing machine 01 comprises application devices 200 operating according to other methods. For example, the processing machine 01 comprises at least one screen printing unit and/or at least one flexographic printing unit and/or at least one letterpress printing unit and/or at least one numbering printing unit and/or at least one gravure printing unit.

The processing machine 01 preferably comprises at least one curing device 300. The at least one curing device 300 is preferably arranged along the transport path provided for the transport of substrate 02, in particular sheets 02, downstream from the at least one application device 200 or downstream from the at least one application point 201, in particular printing nip 201. For example, the at least one curing device 300 is arranged along the transport path provided for the transport of substrate 02, in particular sheets 02, downstream from each application device 200 or downstream from each application point 201, in particular printing nip 201. The at least one curing device 300 preferably comprises at least one first curing unit 321, in particular for curing material applied to a first side of sheets 02 or for drying the first side of sheets 02. More preferably, the at least one curing device 300 also comprises a second curing unit 322, in particular for curing material applied to a second side of sheets 02 or for drying the second side of sheets 02. The second side is in particular the side located opposite the first side. The transport path provided for the transport of sheets 02 preferably extends between the first curing unit 321 and the second curing unit 322.

The curing device 300 preferably comprises at least one UV radiation source 302 and/or at least one LED UV radiation source 302. Preferably, at least one curing section of the transport path provided for the transport of sheets 02 is defined by at least one operating zone of the curing device 300. This curing section is, for example, the section of the transport path provided for the transport of sheets 02 which overlaps with an operating zone of the curing device 300, for example since corresponding electromagnetic radiation is emitted so as to be directed at this curing device 300 by means of the curing device 300 and in particular the at least one LED UV radiation source 302 thereof.

The at least one curing device 300 comprises, and in particular the at least one first curing unit 321 and/or the at least one second curing unit 322 comprise, at least one radiation source 302 for electromagnetic radiation, for example infrared radiation and/or UV radiation. Preferably, the at least one curing device 300 comprises, and in particular the at least one first curing unit 321 and/or the at least one second curing unit 322 comprise, at least one radiation source 302 for ultraviolet radiation, that is, for electromagnetic radiation with at least a predominant fraction of emitted radiant power that is in the UV spectral region, for example between 100 nm and 380 nm. This at least one radiation source 302 for ultraviolet radiation is also referred to as UV radiation source 302. Radiation in the ultraviolet region of the electromagnetic spectrum can be applied by this at least one curing device 300 to the substrate 02 passing the at least one curing device 300 on the transport path thereof for drying the same or for curing the applied material. The at least one UV radiation source 302 is preferably designed as an LED UV radiation source 302. An LED UV radiation source 302 is a radiation source 302 that is designed as a light emitting diode (LED) and designed to emit ultraviolet radiation. Preferably, a curing device 300 in particular for curing the applied material, which comprises at least one LED UV radiation source 302, is arranged along the transport path provided for the transport of sheets 02, downstream from the at least one application point 201.

Preferably, the at least one curing device 300 comprises, and in particular the at least one first curing unit 321 and/or the at least one second curing unit 322 comprise, in each case a plurality of UV radiation sources 302, in particular LED UV radiation sources 302, which are arranged at various points, based on the transverse direction A, so as to be aligned with the transport path provided for the transport of substrate 02. More preferably, the at least one curing device 300 comprises, and in particular the at least one first curing unit 321 and/or the at least one second curing unit 322 comprise, in each case at least five UV radiation sources 302, in particular LED UV radiation sources 302, which are arranged at various points, based on the transverse direction A, so as to be aligned with the transport path provided for the transport of sheets 02, still more preferably at least ten per meter, still more preferably at least twenty per meter, and still more preferably at least fifty per meter, and still more preferably at least one hundred per meter. For example, multiple LED UV radiation sources 302 of the at least one curing device 300, and in particular of the at least one first curing unit 321 and/or of the at least one second curing unit 322, are consecutively arranged in the transport direction T and/or along the transport path provided for the transport of substrate 02, in particular in each case at least two, preferably in each case at least five, and more preferably in each case at least ten. For example, the LED UV radiation sources 302 are arranged in the form of a matrix made up of multiple rows and multiple columns, which is referred to, for example, as an LED array. As an alternative or in addition, the LED UV radiation sources 302 can be arranged so as to be at least partly displaceable in the position thereof based on the transverse direction A, in particular for the adaptation to a position, based on the transverse direction A, of material to be cured on the substrate 02.

The LED UV radiation sources 302 of the at least one curing device 300 can preferably be activated individually and/or groupwise, in particular in subgroups that are smaller than the total number of LED UV radiation sources 302 of the at least one curing device 300, more preferably smaller than half the LED UV radiation sources 302 of the at least one curing device 300, still more preferably smaller than one fifth of the LED UV radiation sources 302 of the at least one curing device 300, and still more preferably smaller than one tenth of the LED UV radiation sources 302 of the at least one curing device 300.

The LED UV radiation sources 302 of the at least one first curing unit 321 can preferably be activated individually and/or groupwise, in particular in subgroups that are smaller than the total number of LED UV radiation sources 302 of the at least one first curing unit 321, more preferably smaller than half the LED UV radiation sources 302 of the at least one first curing unit 321, still more preferably smaller than one fifth of the LED UV radiation sources 302 of the at least one first curing unit 321, and still more preferably smaller than one tenth of the LED UV radiation sources 302 of the at least one first curing unit 321. The LED UV radiation sources 302 of the at least one second curing unit 322 can preferably be activated individually and/or groupwise, in particular in subgroups that are smaller than the total number of LED UV radiation sources 302 of the at least one second curing unit 322, more preferably smaller than half the LED UV radiation sources 302 of the at least one second curing unit 322, still more preferably smaller than one fifth of the LED UV radiation sources 302 of the at least one second curing unit 322, and still more preferably smaller than one tenth of the LED UV radiation sources 302 of the at least one second curing unit 322.

Due to the groupwise activation, an adaptation of the activation of the particular LED UV radiation sources 302 to a distribution and/or an amount of the material applied to the substrate 02 can be carried out. For example, the LED UV radiation sources 302 can be activated in strips when curing across an entire width is not necessary. For example, the LED UV radiation sources 302 can be operated in a synchronized manner so that radiation is only emitted when material to be cured is in the process of being transported through beneath the particular LED UV radiation source 302. It is possible, for example, that the particular LED UV radiation sources 302 cannot just be switched on with respect to the emitted radiant power but can also be operated at different selectable intensity ranges.

The sheet processing machine 01 preferably comprises at least one cooling device 301, comprising at least one cooling element 303, which more preferably comprises a line system through which cooling liquid can flow for the transport of this cooling liquid.

Preferably, at least one cooling device 301, which comprises at least one cooling element 303 designed as a cooling cylinder 303, is arranged along the transport path provided for the transport of sheets 02, downstream from the at least one application point 201. Preferably, the curing device 300, in particular for curing the applied material, is arranged along the transport path provided for the transport of sheets 02, downstream from the at least one application point 201 and upstream from the at least one cooling cylinder 303. In particular, at least one cooling device 301 is preferably assigned to the curing device 300, comprising at least one cooling element 303, which more preferably comprises a line system through which cooling liquid can flow for the transport of this cooling liquid. In particular, at least one cooling section of the transport path provided for the transport of sheets 02 is defined by at least one operating zone of the at least one cooling element 303. This cooling section is, for example, the section of the transport path provided for the transport of sheets 02 which overlaps with an operating zone of the cooling device 301, for example since in particular sheet-format substrate 02 can be cooled there by way of contact with the at least one cooling element 303 of the at least one cooling device 301. Preferably, any cooling section is arranged downstream from any curing section. In particular, the at least one cooling device 301 is arranged along the transport path provided for the transport of sheets 02, downstream from an operating zone of the at least one LED UV radiation source 302, and preferably downstream from the operating zone of each LED UV radiation source 302.

The at least one cooling element 303 is preferably designed as a rotatable cooling cylinder 303. The cooling device 301 preferably comprises exactly one cooling cylinder 303. This at least one, and preferably exactly one, cooling cylinder 303 preferably comprises at least one gripper system 342 for gripping sheets 02. The cooling cylinder 303 is preferably actively driven. For example, the at least one cooling cylinder 303 is arranged so as to be rotatable by way of a gear and/or a drive that is assigned to the cooling cylinder 303.

The at least one application device 200 preferably comprises at least one forme cylinder 202, which is, in particular, designed to carry at least one printing forme. An effective circumference of the at least one cooling cylinder 303 preferably corresponds to an integer multiple of an effective circumference of this at least one forme cylinder 202. An integer multiple shall, in particular, be understood to mean a doubling, tripling or quadrupling, and in particular not an identical effective circumference.

Even though the cooling cylinder 303 is only described above and below as a cooling cylinder 303, it can, in principle, be used as a temperature control cylinder 303. The cooling cylinder 303 preferably comprises at least one cylinder barrel 326 and two cylinder journals 336; 337 arranged at the ends thereof. A cylinder axis 308 is preferably assigned to the cylinder barrel 326, which in particular serves as the axis of rotation 308 thereof. The cooling cylinder 303 preferably comprises a line system 333 designed for conducting through temperature control medium that is, in particular, designed as coolant. The cylinder barrel 326 preferably comprises at least one preferably substantially tubular base body 327. A substantially tubular base body 327 shall be understood to mean a base body 327 that extends along the cylinder axis 308 and the cross-section of which, in a sectional illustration, with a plane orthogonal to the cylinder axis 308, has a substantially, that is, at least 70%, circular outer delimitation. Preferably, at least 50%, more preferably at least 70%, still more preferably at least 85%, still more preferably at least 90%, and still more preferably at least 95% of the base body 327 is made of aluminum. The base body 327 is preferably produced from an aluminum alloy. In addition to aluminum, this aluminum alloy comprises, for example, at least fractions composed of silicon and/or iron and/or copper and/or manganese and/or magnesium and/or chromium and/or zinc and/or titanium. For example, the base body 327 is produced from a material according to EN AW-5083. At the outer surface 328, the base body 327 preferably comprises a layer generated by way of anodizing, which more preferably is designed as a hard anodized layer according to ISO 10074 and/or has a layer thickness of at least 25 μm and/or no more than 100 μm and which, more preferably, has a layer thickness of at least 40 μm and/or no more than 60 μm.

An outer surface 328 of the cylinder barrel 326 preferably has at least one transport region 329, which is designed as a bearing surface 329 for sheet-format substrate 02. This at least one transport region 329 has the shape of a part of an outer cylindrical surface 329, for example. The outer surface 328 of the cylinder barrel 326 preferably comprises at least one cylinder channel 331 in which at least one holding means 332, comprising a gripper system 342, for holding sheet-format substrate 02 is arranged. The gripper system 342 preferably comprises gripper fingers that can be moved in the manner known per se and that can be pressed against corresponding contact surfaces, for example so as to clamp leading edges of sheets. The at least one gripper system 342 can be controlled, for example, by way of a gear, which comprises at least one scanner 344 and at least one cam disk 343. For controlling the gripper system 342, and in particular the gripper fingers, of the at least one holding means 332, the cooling cylinder 303 preferably comprises at least one scanning means 344 that is designed to cooperate with a cam disk 343. Such a cam disk 343 is preferably a component of the sheet processing machine 01. The cylinder channel preferably has two such cylinder channels 331 with corresponding holding means 332. For example, the at least one cylinder channel 331 is designed as a cylinder channel 331 that is milled into the base body 327.

The in particular tubular base body 327 preferably comprises a multitude of flow lines 334 configured as boreholes 334, which extend parallel to the cylinder axis 308 and are designed as components of the line system 333. These boreholes 334 are more preferably designed as deep boreholes 334. The flow lines 334 configured in particular as boreholes 334 preferably extend parallel to the cylinder axis 308 across the entire base body 327. This applies to a multitude, and more preferably to each individual, of these flow lines 334. Preferably, at least 50%, more preferably at least 75%, and still more preferably at least 85% of all components of all bearing surfaces 329 of the cooling cylinder 303 are located no more than 30 mm away from the next flow line 334.

The base body 327 preferably has an inner cavity 347, which more preferably has a cylindrical shape and which extends across the entire base body 327, in particular parallel to the cylinder axis 308. A dimension 348 of this cavity 347 which is oriented orthogonally with respect to the cylinder axis 308, and in particular the diameter 348 thereof, is preferably at least 50%, more preferably at least 60%, and still more preferably at least 70% of a maximum outside diameter 349 of the base body 327. For example, the outside diameter 349 is between 500 mm and 600 mm, more preferably between 550 mm and 570 mm. For example, the dimension 348 of this cavity 347 which is oriented orthogonally with respect to the cylinder axis 308, and in particular the diameter thereof, is between 350 mm and 480 mm, more preferably between 400 mm and 430 mm. For example, a wall thickness of the base body 327 is between 50 mm and 100 mm, more preferably between 65 mm and 80 mm. A diameter of the multitude of flow lines 334 configured as boreholes 334 in each case is preferably between 10 mm and 30 mm, more preferably between 18 mm and 24 mm.

The cooling cylinder 303 preferably comprises a rotary unit 338 for temperature control medium at at least one, and more preferably at exactly one, cylinder journal 336. The cooling cylinder 303 preferably comprises a gear wheel 346 at at least one, and more preferably at exactly one, cylinder journal 337. Preferably, a rotary union 338 is arranged at exactly one cylinder journal 336 and a gear wheel 346 is arranged at exactly the opposite cylinder journal 337.

The cylinder barrel 326 preferably comprises at least two end pieces 339; 341, which each include line sections 351; 352 and are connected, in terms of flow, to the flow lines 334 of the tubular base body 327. For example, one of these line sections is directly connected to the rotary union 338. The end pieces 339; 341 preferably terminate the inner cavity 347.

The sheet processing machine 01 preferably comprises at least one drive motor. This at least one drive motor is preferably arranged so as to be connected to the at least one gear wheel 346 in a manner that transmits or is capable of transmitting torque, for example via at least one gear wheel and/or at least one chain and/or at least one belt. This at least one drive motor is preferably arranged so as to be connected to the at least one forme cylinder 202 of the at least one application device 200 in a manner that transmits or is capable of transmitting torque, for example via at least one gear wheel and/or at least one chain and/or at least one belt.

The at least one cooling cylinder 303 preferably comprises at least one feed device 338, which is designed, for example, as at least one rotary union 338. The at least one feed device is preferably designed as a gas feed device and/or gas discharge device and/or liquid feed device and/or liquid discharge device. The at least one feed device is preferably used to feed and/or discharge gas and/or at least one temperature control liquid, in particular cooling liquid. The at least one feed device is preferably designed as at least one rotary union.

The sheet processing machine 01 preferably comprises the upstream sheet transport means 304, which is in particular designed as a first chain conveyor system 304, and more preferably a chain gripper system 304, and which more preferably comprises at least one rear chain deflection shaft 306. Preferably, at least one sheet transport means 304, which is also referred to as an upstream sheet transport means 304, is arranged along the transport path provided for the transport of sheets 02, downstream from the at least one application device 200 and the at least one cooling device 301. The upstream sheet transport means 304 preferably comprises at least one gripper system for gripping sheets 02. In one embodiment, the upstream sheet transport means 304 is designed, for example, as a transport cylinder. The upstream sheet transport means 304 is preferably designed as an in particular first chain conveyor system 304 or first chain gripper system 304 and more preferably comprises at least one rear chain deflection shaft 306. Preferably, a respective operating zone of the at least one, and preferably each, radiation source 302 of the curing device 300 designed in particular as a UV radiation source 302 and/or LED UV radiation source 302 is arranged so as to be aligned with such a section of the transport path provided for the transport of sheets 02, which is defined by the upstream sheet transport means 304, in particular the first chain conveyor system 304. In particular, the curing section is preferably at least partly, and more preferably completely, defined by the at least one upstream sheet transport means 304 that is preferably designed as the first chain conveyor system 304.

Preferably, an in particular first transfer point 309 is defined for, in particular directly, transferring sheets 02 from the upstream sheet transport means 304 to the cooling element 303, which is in particular designed as a cooling cylinder 303. In the case in which the upstream sheet transport means 304 is designed as an in particular first chain conveyor system 304, the in particular first transfer point 309 for transferring sheets 02 from the first chain conveyor system 304 to the cooling element 303 designed as the cooling cylinder 303 is preferably defined in the region of the rear chain deflection shaft 306 of the first chain conveyor system 304.

Preferably, the sheet processing machine 01 thus comprises a first chain conveyor system 304, which comprises at least one rear chain deflection shaft 306, wherein the in particular first transfer point 309 for transferring sheets 02 from the first chain conveyor system 304 to the cooling element 303 designed as the cooling cylinder 303 is defined in the region of the rear chain deflection shaft 306 of the first chain conveyor system 304. An axis of rotation 308 of the cooling element 303 designed as the cooling cylinder 303 is preferably arranged lower, based on a vertical direction V, than an axis of rotation 306 of the rear chain deflection shaft 306 of the first chain conveyor system 304.

The sheet processing machine 01 preferably comprises at least one inspection device 400, which is arranged so as to be aligned with a region of the transport path provided for the transport of sheets 02, which is arranged downstream from the at least one cooling element 303. This region is also referred to as inspection region. The at least one inspection device 400 preferably comprises a first inspection unit 401, in particular for inspecting a first side of sheets 02. Preferably, in particular in the case of a sheet processing machine 01 for processing sheets 02 on both sides, the at least one inspection device 400 comprises a second inspection unit 402, in particular for inspecting a second side of sheets 02. The transport path provided for the transport of sheets 02 then extends between the first inspection unit 401 and the second inspection unit 402.

The first inspection unit 401 preferably comprises at least one sensor device for detecting electromagnetic radiation in the visible range of the spectrum. As an alternative or more preferably in addition, the first inspection unit 401 preferably comprises at least one sensor device for detecting electromagnetic radiation in a first portion of the infrared region of the spectrum. More preferably, the first inspection unit 401, in particular in addition to the sensor device for detecting electromagnetic radiation in the visible range of the spectrum, comprises at least two sensor devices for detecting electromagnetic radiation in the infrared range of the spectrum, wherein these two sensor devices differ in terms of the wavelength range these are able to detect.

The second inspection unit 402 preferably comprises at least one sensor device for detecting electromagnetic radiation in the visible range of the spectrum. As an alternative or more preferably in addition, the second inspection unit 402 preferably comprises at least one sensor device for detecting electromagnetic radiation in a first portion of the infrared region of the spectrum. More preferably, the second inspection unit 401, in particular in addition to the sensor device for detecting electromagnetic radiation in the visible range of the spectrum, comprises at least two sensor devices for detecting electromagnetic radiation in the infrared range of the spectrum, wherein these two sensor devices differ in terms of the wavelength range these are able to detect.

Preferably, the first inspection unit 401 comprises at least one camera and/or at least one contact image sensor and/or the second inspection unit 402 comprises at least one camera and/or at least one contact image sensor. Preferably, the first inspection unit 401 comprises at least one first illumination unit and/or the second inspection unit 402 comprises at least one second illumination unit. These are preferably matched to the part of the spectrum to be detected.

A first inspection transport body 403, with which at least one sensor device of the first inspection unit 401 is aligned, is preferably assigned to the first inspection unit 401. This first inspection transport body 403 is preferably designed as an in particular first inspection transport cylinder 403. Preferably, at least one first inspection transport body 403, which is in particular designed as a first inspection transport cylinder 403, and with which at least one sensor device of a first inspection unit 401 is aligned, is arranged along the transport path provided for the transport of sheets 02, downstream from the at least one cooling element 303. The first inspection transport body 403, which is preferably designed as a first inspection transport cylinder 403, preferably comprises at least one gripper system for gripping sheets 02. As an alternative or preferably in addition, the first inspection transport cylinder 403 is preferably configured as a suction transport cylinder 403. A suction transport cylinder 403 shall, in particular, be understood to mean a cylinder that is designed to transport in particular sheet-format substrate 02 on the outer cylindrical surface thereof and that, on this outer cylindrical surface, has a multitude of suction openings, which are arranged so as to be connected and/or connectible to a vacuum source.

A second inspection transport body 404, with which at least one sensor device of the second inspection unit 402 is aligned, is preferably assigned to the second inspection unit 402. This second inspection transport body 404 is preferably designed as an in particular second inspection transport cylinder 404. The inspection transport body 404, which is preferably designed as the second inspection transport cylinder 404, preferably comprises at least one gripper system for gripping sheets 02. As an alternative or preferably in addition, the second inspection transport cylinder 404 is designed as a suction transport cylinder 404.

The sheet processing machine 01 preferably has an in particular second transfer point 311 for transferring sheets 02 from the cooling element 303 that is preferably designed as a cooling cylinder 303 to the first inspection transport body 403, which is preferably designed as a first inspection transport cylinder 403. The sheet processing machine 01 preferably has an in particular third transfer point 312 for transferring sheets 02 from the first inspection transport body 403, which is in particular designed as the first inspection transport cylinder 403, to the second inspection transport body 404, which is in particular designed as the second inspection transport cylinder 404. An axis of rotation 313 of the first inspection transport body 403 and, in particular, of the first inspection transport cylinder 403 is preferably arranged lower, based on a vertical direction V, than an axis of rotation 308 of the cooling element 303 which is preferably designed as a cooling cylinder 303. An axis of rotation 314 of the second inspection transport body 404, which is in particular designed as the second inspection transport cylinder 404, is preferably arranged lower, based on a vertical direction V, than the axis of rotation 313 of the first inspection transport body 403, which is in particular designed as the first inspection transport cylinder 403.

Preferably, at least one sheet transport means 506, which is also referred to as a downstream sheet transport means 506, is arranged along the transport path provided for the transport of sheets 02, downstream from the inspection device 400, in particular downstream from the first inspection unit 401, and more preferably downstream from the second inspection unit 402. The downstream sheet transport means 506 preferably comprises at least one gripper system for gripping sheets 02. In one embodiment, the downstream sheet transport means 506 is designed, for example, as a transport cylinder. The downstream sheet transport means 506 is preferably designed as an in particular second chain conveyor system 506, in particular chain gripper system 506, and more preferably comprises at least one front chain deflection shaft 317. The second chain conveyor system 506 is preferably used to feed sheets 02 to a respective assigned delivery station 501; 502; 503; 504 of the substrate output device 500.

Preferably, an in particular fourth transfer point 316 for, in particular directly, transferring sheets 02 from an inspection transport body 403; 404, and in particular from the second inspection transport body 404, to the downstream sheet transport means 506 is defined. In the case in which the downstream sheet transport means 506 is designed as the in particular second chain conveyor system 506 or chain gripper system 506, the in particular fourth transfer point 316 for transferring sheets 02 from an inspection transport body 403; 404, and in particular from the second inspection transport body 404, to the in particular second chain conveyor system 506 is preferably defined in the region of the front chain deflection shaft 317 of the in particular second chain conveyor system 506. The sheet processing machine 01 preferably has the fourth transfer point 316 for transferring sheets 02 from the second inspection transport body 404, which is in particular designed as the second inspection transport cylinder 404, to the front chain deflection shaft 317 of a second chain conveyor system 506. An axis of rotation 318 of the front chain deflection shaft 317 of the second chain conveyor system 506 is preferably arranged lower, based on a vertical direction V, than an axis of rotation 314 of the second inspection transport body 404, which is in particular designed as the second inspection transport cylinder 404.

The sheet processing machine 01 preferably comprises the at least one substrate output device 500, which is preferably designed as a delivery device 500, in particular sheet delivery 500, in particular in addition to the at least one application device 100 and/or in addition to the at least one curing device 300 and/or in addition to the at least one inspection device 400 and/or along the transport path provided for the transport of sheets 02, downstream from the at least one, and more preferably downstream from each, application device 100 and/or downstream from the at least one curing device 300 and/or downstream from the at least one cooling device 301 and/or downstream from the at least one inspection device 400. The sheet delivery 500 preferably comprises at least partly a sheet conveyor system 506, which is in particular designed as a chain conveyor system 506. This chain conveyor system 506 is preferably identical to the second chain gripper system 506, to which the sheets 02 are transferred from the inspection device 400, and in particular from an inspection transport body 403; 404.

The sheet conveyor system 506 comprises, for example, traction means moved by way of driving and deflection means, which drive gripping devices for conveying the sheets. The gripping devices comprise fixing elements for receiving and fixing the sheets 02. Fixing elements that can be used include in particular clamping and/or suction grippers for gripping the sheet edges. By means of the sheet delivery 500, the sheets 02 are preferably deposited onto at least one, or more preferably one of multiple transport bases, which are, for example, configured as a pallet or in another manner, in the form of a respective delivery pile. For example, a sheet guide device is arranged in the sheet delivery 500. A respective braking system for decelerating the sheets 02 released by the gripper devices is preferably arranged in front of the corresponding delivery pile. The sheets 02 that are decelerated by the braking system bear against front stops and in this way are deposited in an aligned manner onto the particular delivery pile. The respective delivery pile is preferably lowered by a pile lifting drive by the respective deposited sheet thickness so that the pile surface always assumes an approximately constant level.

For example, the sheet delivery 500 is equipped with a non-stop device for transporting delivery piles away without interruption. This predominantly comprises an auxiliary pile carrier. As an alternative or in addition, the delivery device 500, along the transport path provided for the transport of the substrate 02 and/or the sheets 02, comprises at least two, more preferably at least three, and still more preferably at least four, delivery stations 501; 502; 503; 504 that are in particular arranged one behind the other along the transport path provided for the transport of sheets 02. The at least one delivery device 500 is thus preferably designed as a multiple pile delivery unit 500, in particular at least as a dual pile delivery unit 500 or at least as a triple pile delivery unit 500 or at least as a quadruple pile delivery unit 500. The delivery stations 501; 502; 503; 504 are also referred to as pile deliveries 501; 502; 503; 504. A respective delivery station 501; 502; 503; 504 or pile delivery 501; 502; 503; 504 shall in particular be understood to mean a device that is used for forming a respective pile. At least two or three or four different delivery piles can thus be formed by means of the at least two or at least three or at least four delivery stations 501; 502; 503; 504, without having to remove another pile in each case. The multiple pile delivery unit 500 can also comprise five or even more delivery stations 501; 502; 503; 504 or pile deliveries 501; 502; 503; 504.

Preferably, the at least one curing device 300 and/or the at least one cooling device 301 and/or the at least one inspection device 400 are arranged along the transport path provided for the transport of substrate 02, upstream from each delivery station 501; 502; 503; 504 of the delivery device 500.

The sheet processing machine 01 preferably comprises a curing and inspection module 600. The curing and inspection module 600 preferably comprises the curing device 300. The curing and inspection module 600 preferably comprises the at least one cooling element 303 designed as a cooling cylinder 303. The curing and inspection module 600 preferably comprises the at least one inspection device 400. More preferably, the curing and inspection module 600 comprises the curing device 300 and the at least one cooling element 303 designed as a cooling cylinder 303 and the at least one inspection device 400. The curing and inspection module 600 preferably comprises a dedicated machine frame 601; 602; 603, which is in particular separated and/or separable from machine frame parts of other regions of the sheet processing machine 01.

The machine frame 601; 602; 603 of the curing and inspection module 600, for example, comprises a first frame section 601, a second frame section 602, and a third frame section 603. The three frame sections 601; 602; 603 are preferably rigidly connected to one another, at least during operation. For example, each of these frame sections 601; 602; 603 in each case comprises two frame side walls. The first frame section 601 is preferably arranged along the transport path provided for the transport of sheets 02, upstream from the second frame section 602. The second frame section 602 is preferably arranged along the transport path provided for the transport of sheets 02, upstream from the third frame section 603.

For example, the first frame section 601 is arranged so as to carry at least one, and preferably each, sensor device of the first inspection unit 401 of the inspection device 400. For example, the first frame section 601 is arranged so as to carry at least one, and preferably each, radiation source 302 of the curing device 300, which is in particular designed as an LED UV radiation source 302. For example, the third frame section 603 is arranged so as to carry at least one, and preferably each, sensor device of the second inspection unit 402 of the inspection device 400. For example, an axis of rotation 308 of the cooling element 303, which is in particular designed as a cooling cylinder 303, and an axis of rotation 313 of the first inspection transport cylinder 403 and an axis of rotation 314 of the second inspection transport cylinder 404 are arranged at the second frame section 602. For example, the axis of rotation 307 of the rear chain deflection shaft 306 of the first chain conveyor system 304 and/or the axis of rotation 318 of the front chain deflection shaft 317 of the second chain conveyor system 506 are arranged at the second frame section 602. For example, the first frame section 601 is arranged so as to carry a part of a guide system of the first chain conveyor system 304. For example, the third frame section 603 is arranged so as to carry a part of a guide system of the second chain conveyor system 506. For example, the machine frame 601; 602; 603 of the curing and inspection module 600 carries at least all components that define the transport path provided for the transport of sheets 02 between the first transfer point 309 and the fourth transfer point 316.

The transport path provided for the transport of in particular at least partially separated sheets 02 preferably starts at the substrate feed device 100 and/or preferably ends at the sheet delivery 500. Piles comprising several sheets 02 are preferably fed to the substrate feed device 100 and/or removed from the sheet delivery 500. The transport path of these piles shall not be considered to be part of the transport path provided for the transport of sheets 02.

Although the disclosure herein has been described in language specific to examples of structural features and/or methodological acts, it is to be understood that the subject matter defined in the appended claims is not necessarily limited to the specific features or acts described in the examples. Rather, the specific features and acts are disclosed merely as example forms of implementing the claims.

The invention claimed is:

1. A sheet processing machine (01), wherein a transport path is provided for a transport of sheets (02) assigned to the sheet processing machine (01), the sheet processing machine (01) comprising:

at least one application device (200) configured as a simultaneous printing unit (200) with at least one application point (201) including at least a first transfer cylinder (204) arranged along the transport path for applying material to the sheets (02), the first transfer cylinder 204 cooperating with multiple forme cylinders (202) that each provide a different respective material to the first transfer cylinder (204) for transfer together to a same sheet (02);

at least one cooling device (301) arranged along the transport path, downstream from the at least one application point (201), the at least one cooling device (301) including at least one cooling element (303) configured as a cooling cylinder (303), the transport path including a chain gripper system (304) transferring the sheets (02) to the at least one cooling device (301);

at least one curing section of the transport path including a curing unit (300) arranged downstream from the at least one application device (200) and upstream from the at least one cooling device (301), a respective operating zone of at least one radiation source (302) of the curing unit (300) aligned with a portion of the chain gripper system (304) included in the at least one curing section of the transport path; and at least one first inspection transport body (403) arranged along the transport path, downstream from the at least one cooling element (303), and with which at least one sensor device of a first inspection unit (401) of an inspection device (400) is aligned, the first inspection unit (401) comprising at least one first sensor device for detecting electromagnetic radiation in a visible-light range of an electromagnetic spectrum, and the first inspection unit (401) comprising at least one second sensor device for detecting electromagnetic radiation in a portion of an infrared region of the electromagnetic spectrum.

2. The sheet processing machine (01) according to claim 1, characterized in that an effective circumference of the cooling cylinder (303) corresponds to an integer multiple of an effective circumference of at least one forme cylinder (202) of the multiple forme cylinders (202).

3. The sheet processing machine (01) according to claim 1, characterized in that the cooling cylinder (303) comprises at least one gripper system (342) for gripping the sheets (02).

4. The sheet processing machine (01) according to claim 1, characterized in that the sheet processing machine (01) has a transfer point (311) for transferring the sheets (02) from the cooling cylinder (303) to the at least one first inspection transport body (403).

5. The sheet processing machine (01) according to claim 1, characterized in that the at least one radiation source (302) of the curing unit (300) is an LED UV radiation source (302).

6. The sheet processing machine (01) according to claim 5, characterized in that at least one curing section of the transport path is defined by at least one operating zone of the curing unit (300), and that a cooling section of the transport path is defined by at least one operating zone of the at least one cooling element (303), and that any cooling section is arranged downstream from any curing section.

7. The sheet processing machine (01) according to claim 5, characterized in that the sheet processing machine (01) comprises a curing and inspection module (600), and that the curing and inspection module (600) comprises the curing device (300), the at least one cooling element (303), and the inspection device (400), and that the curing and inspection module (600) comprises a dedicated machine frame (601; 602; 603).

8. The sheet processing machine (01) according to claim 1, characterized in that the at least one cooling element (303) comprises a line system through which cooling liquid can flow for transport of the cooling liquid.

9. The sheet processing machine (01) according to claim 1, characterized in that the sheet processing machine (01) comprises at least one simultaneous double printing unit (200) including a second transfer cylinder 204 cooperating with multiple other forme cylinders (202) that each provide a different respective material to the second transfer cylinder (204).

10. A sheet-fed printing machine (01), wherein a transport path is provided for a transport of sheets (02) assigned to the sheet-fed printing machine (01), the sheet-fed printing machine (01) comprising:

at least one application device (200) configured as a simultaneous double printing unit (200) with at least one application point (201) arranged along the transport path for applying material to the sheets (02), the simultaneous double printing unit (200) including at least first and second transfer cylinders (204) arranged along the transport path provided for the transport of sheets (02) for applying material concurrently to a same sheet (02), the first transfer cylinder 204 cooperating with multiple first forme cylinders (202) that each provide a different respective material to the first transfer cylinder (204) and the second transfer cylinder 204 cooperating with multiple second forme cylinders (202) that each provide a different respective material to the second transfer cylinder (204);

a curing device (300), which comprises at least one LED UV radiation source (302), being arranged along the transport path, downstream from the at least one application point (201), the curing device (300) comprising a first curing unit (321) for drying a first side of the sheets (02) and a second curing unit (322) for drying a second side of the sheets (02) located opposite the first side, the transport path extending between the first curing unit (321) and the second curing unit (322);

at least one cooling device (301) assigned to the curing device (300), and comprising at least one cooling element (303), respectively, that includes a line system through which cooling liquid can flow for transport of the cooling liquid, the transport path including a chain gripper system (304) transferring the sheets (02) to the at least one cooling device (301); wherein:

at least one curing section of the transport path is defined by at least one operating zone of the curing unit (300), and the at least one LED UV radiation source (302) of the curing device (300) is aligned with a portion of the chain gripper system (304) associated with the at least one curing section of the transport path;

a cooling section of the transport path is defined by at least one operating zone of the at least one cooling element (303); and any cooling section of the transport path is arranged downstream from any curing section of the transport path;

the sheet-fed printing machine (01) further comprises at least one inspection device (400), which is arranged so as to be aligned with a region of the transport path that is downstream from the at least one cooling element (303); and the at least one inspection device (400) comprises a first inspection unit (401), the first inspection unit (401) comprising at least one first sensor device for detecting electromagnetic radiation in a visible-light range of an electromagnetic spectrum, and the first inspection unit (401) comprising at least one second sensor device for detecting electromagnetic radiation in at least a portion of an infrared region of the electromagnetic spectrum.

11. The sheet-fed printing machine (01) according to claim 10, characterized in that the at least one cooling element (303) is configured as a rotatable cooling cylinder (303).

12. The sheet-fed printing machine (01) according to claim 11, characterized in that the cooling cylinder (303) comprises at least one gripper system (342) for gripping the sheets (02).

13. The sheet-fed printing machine (01) according to claim 11, characterized in that an effective circumference of the at least one cooling cylinder (303) corresponds to an integer multiple of an effective circumference of at least one forme cylinder (202) of the multiple first or second forme cylinders (202).

14. The sheet-fed printing machine (01) according to claim 10, characterized in that a first inspection transport body (403) is assigned to the first inspection unit (401), with which at least one sensor device of the first inspection unit (401) is aligned, and that the first inspection transport body (403) comprises at least one gripper system for gripping the sheets (02) and/or is configured as a suction transport cylinder (403).

15. The sheet-fed printing machine (01) according to claim 10, characterized in that the sheet-fed printing machine (01) comprises a curing and inspection module (600), and that the curing and inspection module (600) comprises the curing device (300) and the at least one cooling element (303) and the at least one inspection device (400), and that the curing and inspection module (600) comprises a dedicated machine frame (601; 602; 603).

* * * * *